United States Patent [19]
Harvey

[11] 3,775,240
[45] Nov. 27, 1973

[54] STRUCTURAL BUILDING MODULE
[75] Inventor: Richard Deane Harvey, Fort Lauderdale, Fla.
[73] Assignee: Heckinger and Associates, Inc., Pompano Beach, Fla.
[22] Filed: Nov. 27, 1970
[21] Appl. No.: 92,994

[52] U.S. Cl. ............ 161/149, 52/94, 52/206, 52/285, 52/295, 52/309, 161/160
[51] Int. Cl. .................................. B32b 3/02
[58] Field of Search ............ 161/43, 205, 206, 161/109, 111, 112, 149, 160, 161; 52/309, 94, 285, 295, 206

[56] References Cited
UNITED STATES PATENTS

| | | | |
|---|---|---|---|
| 3,598,686 | 8/1971 | Clark | 52/309 |
| 3,590,540 | 7/1971 | Johnson et al. | 52/309 |
| 3,593,480 | 7/1971 | Bouchillon | 52/309 |
| 3,449,880 | 7/1969 | Bailey | 52/309 |
| 3,509,010 | 4/1970 | Metzger | 52/309 |
| 3,555,757 | 1/1971 | Volent | 52/309 |
| 3,518,801 | 7/1970 | Redey | 52/309 |
| 3,562,985 | 2/1971 | Nicosia | 52/309 |
| 3,295,278 | 1/1967 | Muhm | 52/309 |
| 3,561,177 | 2/1971 | Agro et al. | 52/309 |
| 3,607,605 | 9/1971 | Suzukawa | 161/161 |
| 2,850,890 | 9/1958 | Rubenstein | 52/612 X |

FOREIGN PATENTS OR APPLICATIONS
773,791  12/1967  Canada ........................ 52/309

Primary Examiner—Harold Ansher
Assistant Examiner—James J. Bell
Attorney—Jones and Lockwood

[57] ABSTRACT

This disclosure relates to a building module and to a building system wherein the module is used in the construction of low cost housing units. The module includes a fiber reinforced plastic shell having a rectangular center portion with upturned edges forming a recess which receives a lightweight foam concrete filler material. The module has window and doorway openings therethrough, and suitable reinforcing members are embedded in the foam concrete material to provide the structural strength required to meet building code specifications and for handling purposes. Preformed building modules are used to construct the exterior walls of an enclosure in the building construction system, the modules being positioned so that the plastic shell faces outwardly, thus providing a weatherproof outside surface for the enclosure. The building system further includes a foundation upon which the modules rest and to which they are secured, prefabricated interior walls and a roof, which permit the structure to be easily assembled.

6 Claims, 27 Drawing Figures

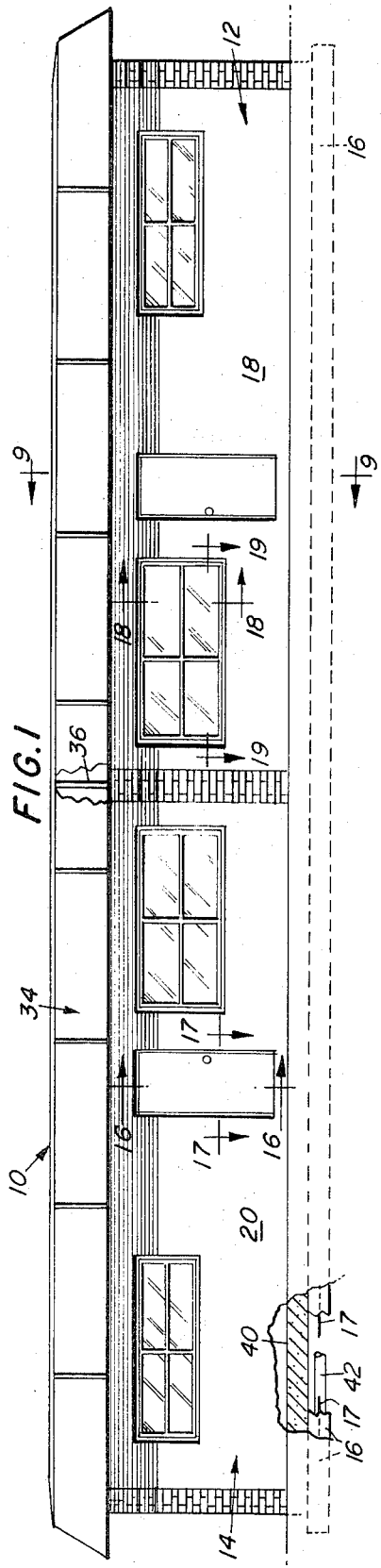

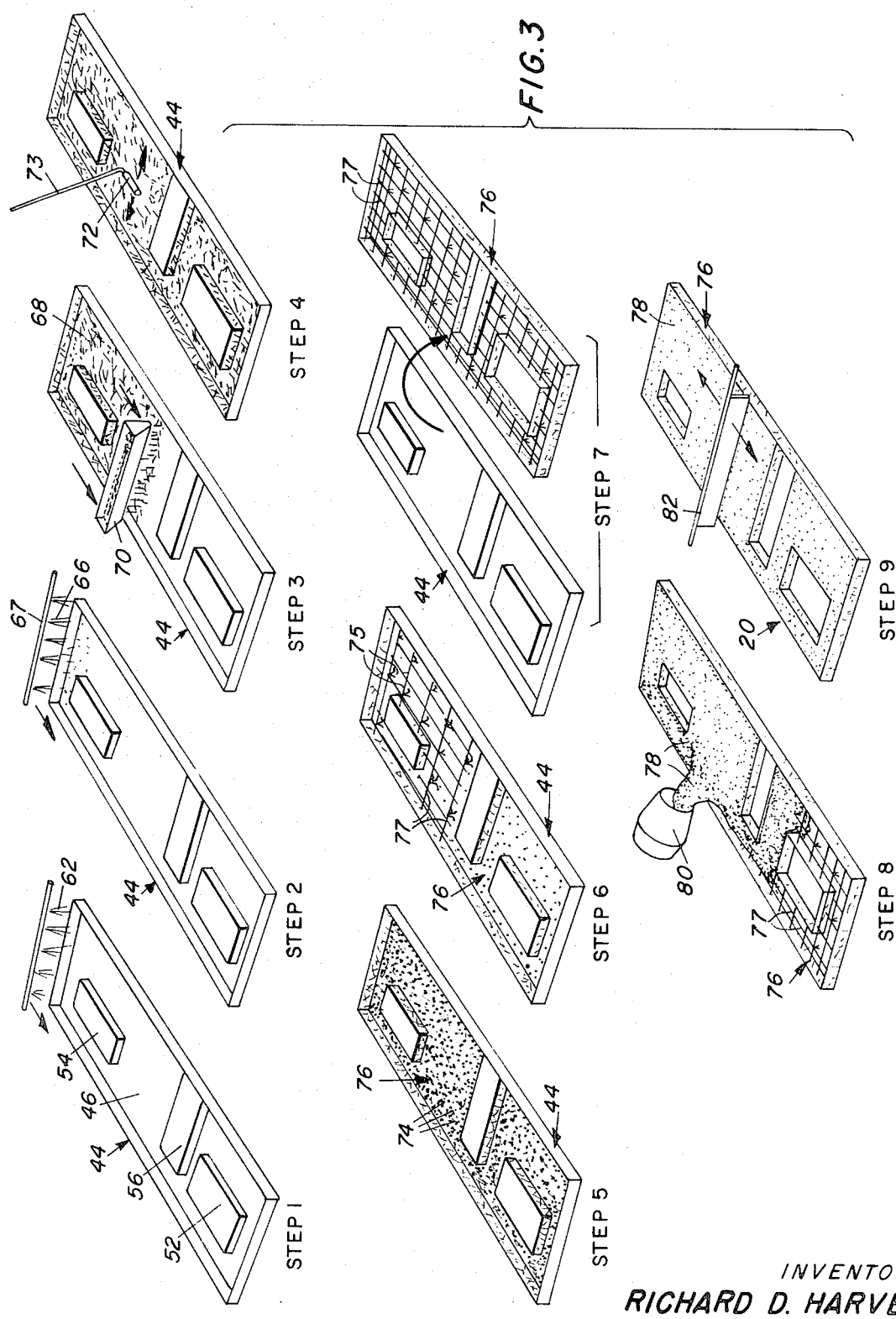

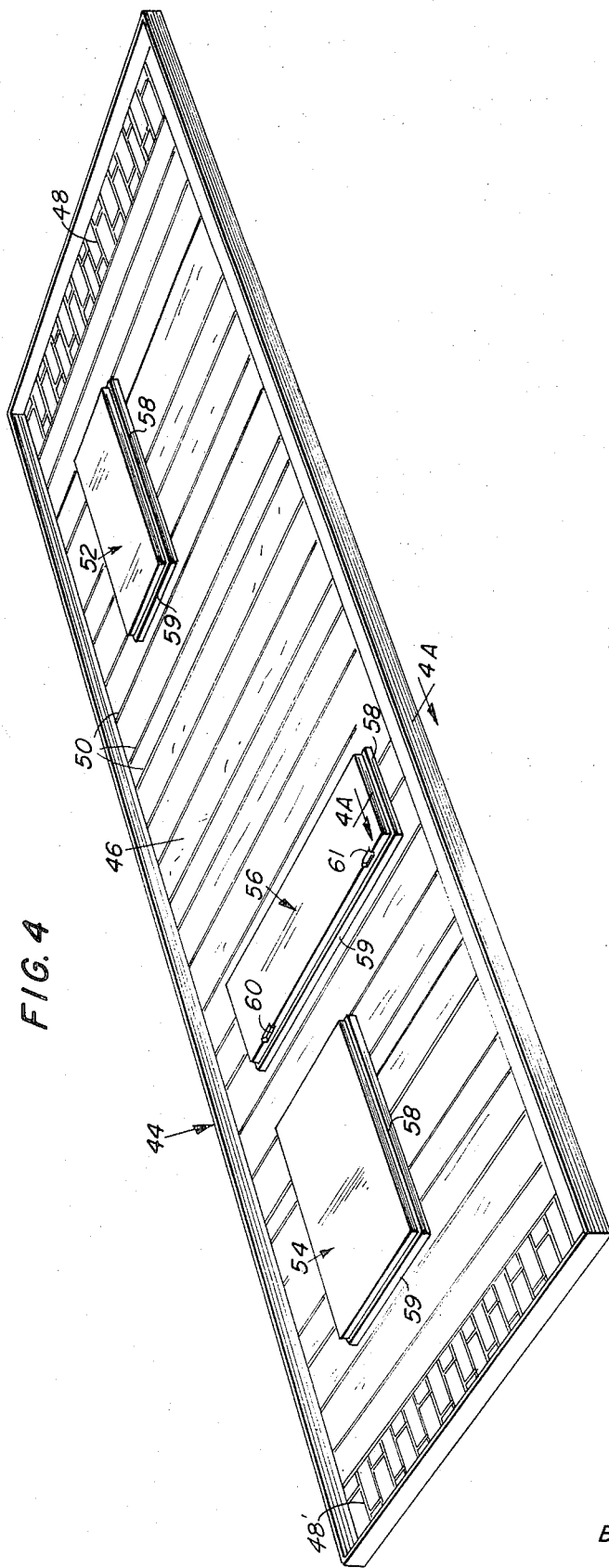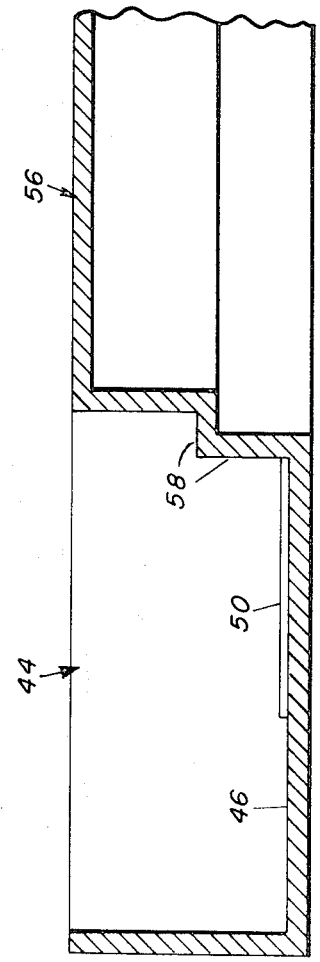

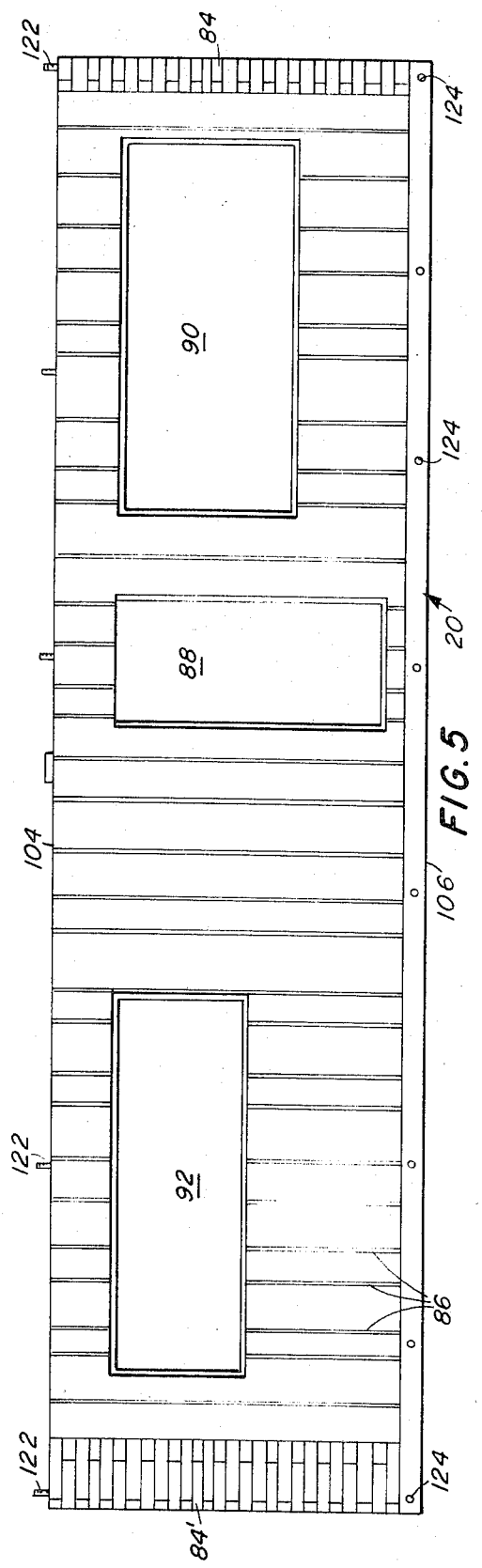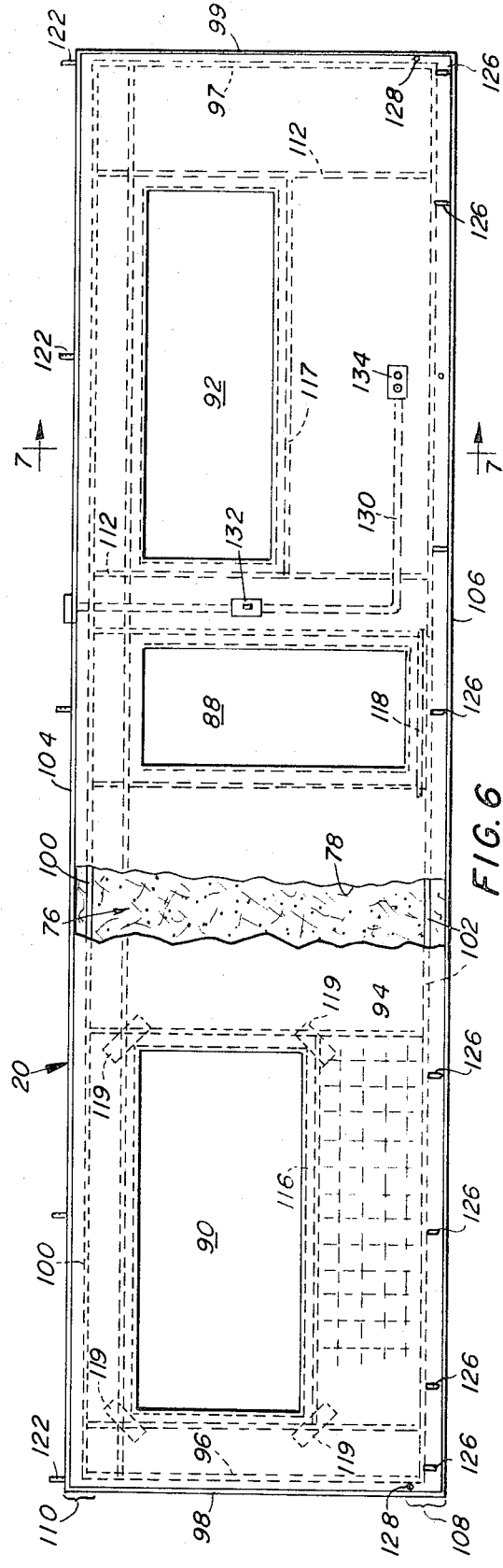

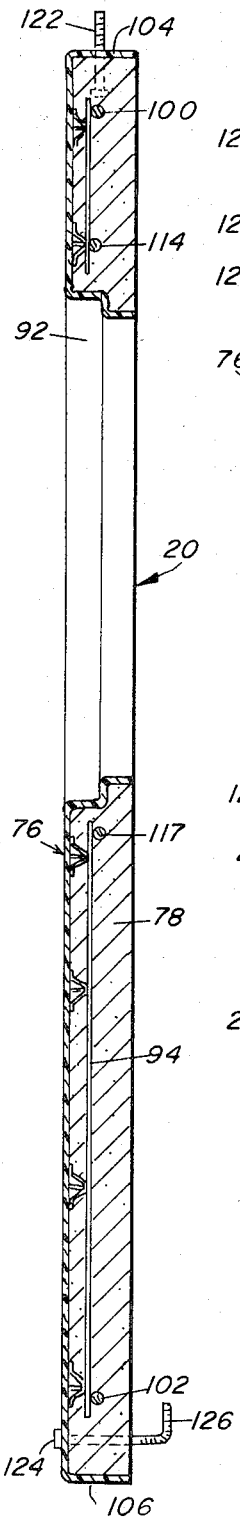
FIG.7
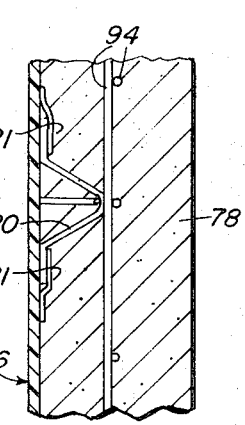
FIG.8
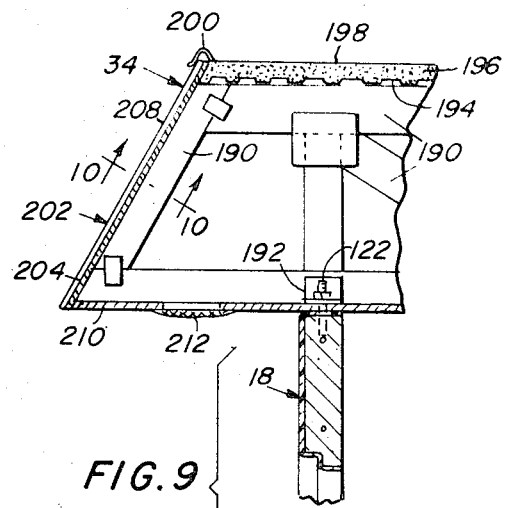
FIG.9
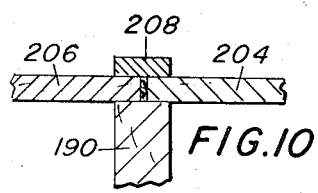
FIG.10
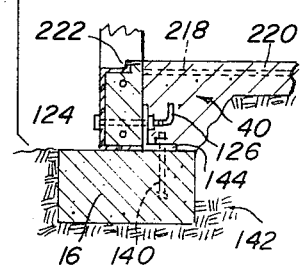
FIG.12
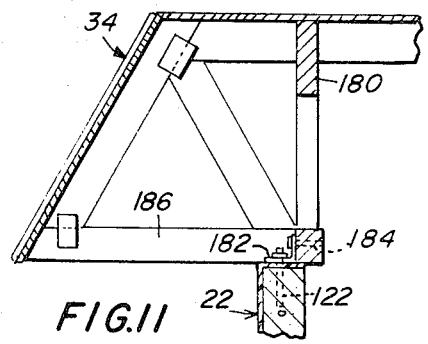
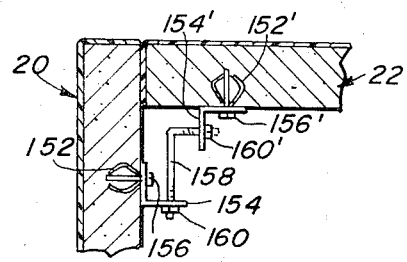
FIG.13
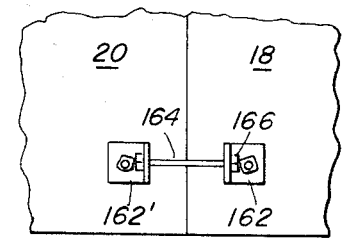
FIG.11
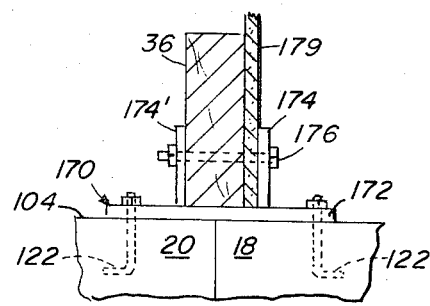
FIG.14   FIG.15

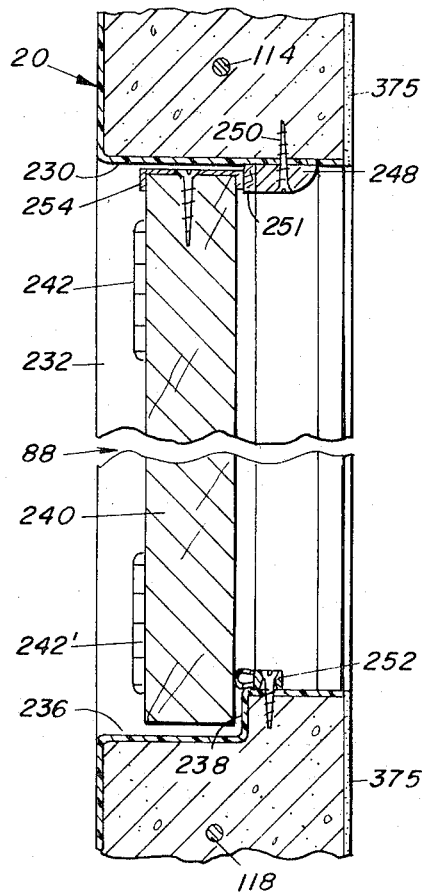
FIG. 16
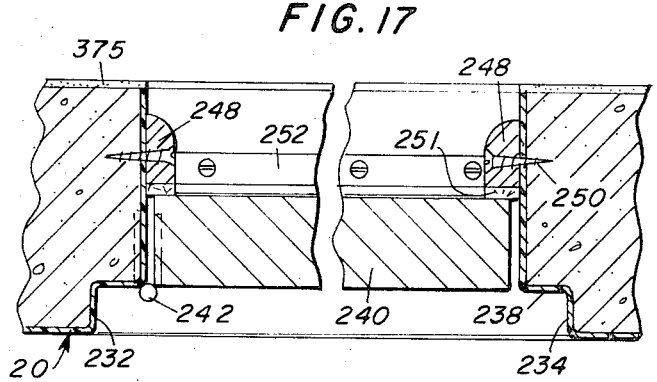
FIG. 17
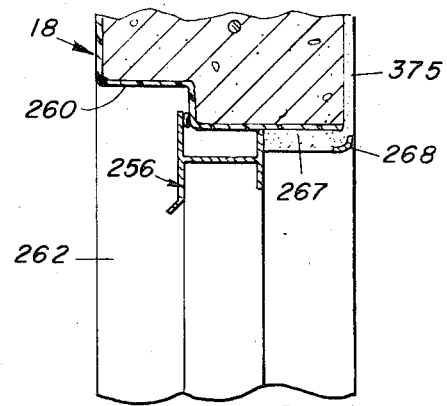
FIG. 18
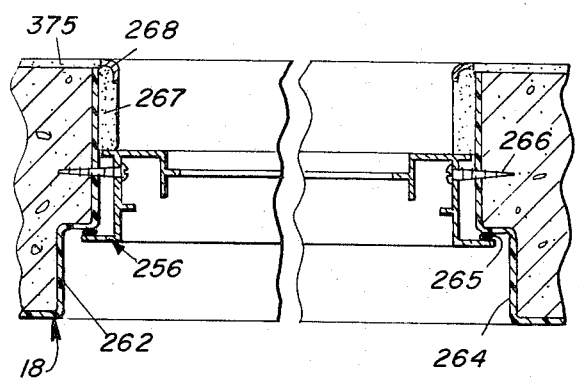
FIG. 19
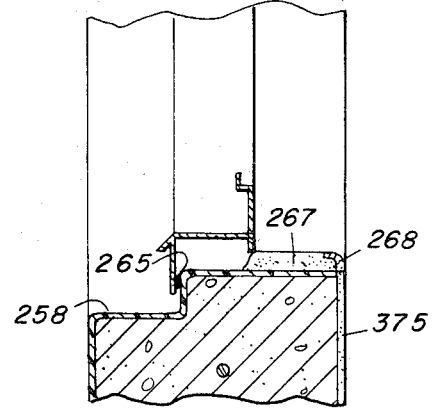

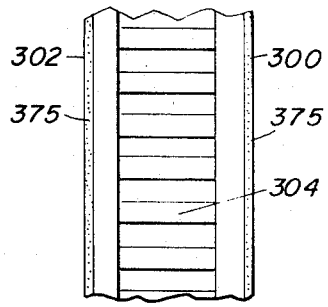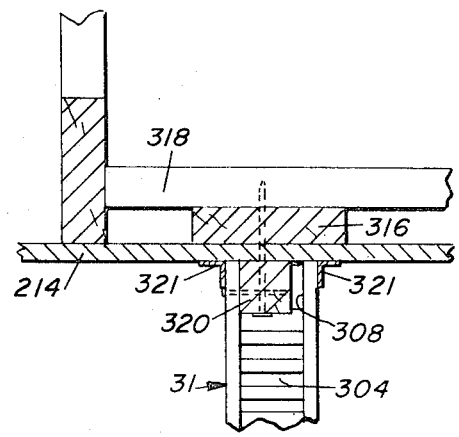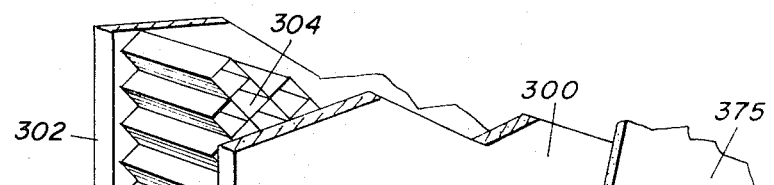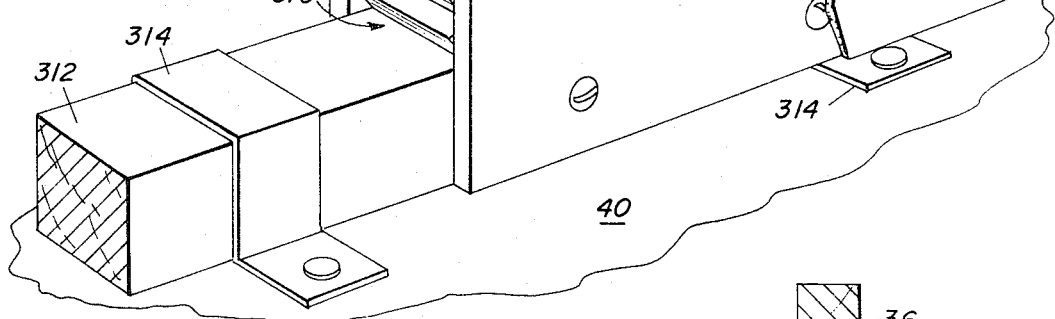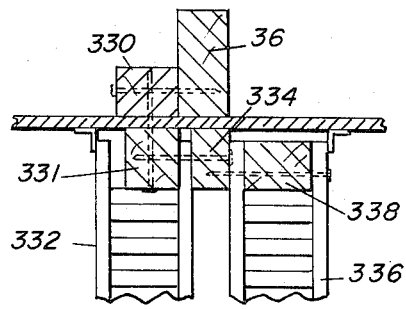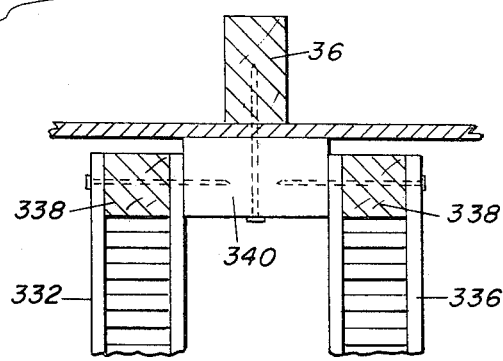
FIG. 22    FIG. 24    FIG. 23    FIG. 25    FIG. 26

STRUCTURAL BUILDING MODULE

BACKGROUND OF THE INVENTION

This invention relates to a building module which can be used to form enclosures, and a process for making such modules and enclosures. More particularly, this invention relates to a module having a plastic shell or form which receives a lightweight concrete material, whereby the module is particularly suited to use as an exterior wall in the manufacture and construction of low cost prefabricated houses. The invention further relates to a method of assembling a prefabricated house using the structural building module.

In the past, there have been many attempts to produce low cost housing which is inexpensive and easy to assemble, yet which is attractive and durable, but without real success. Generally the prior type prefabricated houses required that an extensive and complex foundation be prepared and that a floor structure be assembled on the foundation before the prefabricated exterior and interior walls could be erected. A roof was then placed over the structure to complete the house structurally except for certain interior features such as hanging doors, putting in appliances, and building cabinets. The prefabricated walls of such houses were usually stud walls made of upper and lower horizontal members and a plurality of vertical members secured therebetween, the upper and lower members being covered on each side with an exterior siding or interior panels. These prefabricated walls were normally secured to the floor structure in the normal manner like any other non-prefabricated stud wall.

Over the years, the cost of lumber and labor has so increased that the conventional prefabricated house is no longer practical for low cost housing developments. The cost of labor required to assemble one of the above-described houses has simply placed the house far out of the reach of the low income family. Therefore, other attempts have been made to devise and produce low cost living units which are within the range of the low income family.

One attempt to solve the problem has been the development and the manufacture of complete units which are assembled at a factory and carried to a building site where they are clustered together in a randomly arranged living complex of many family units. There are some disadvantages to this type of arrangement, for example, many people are attempting to escape this type of communal living and the cost of design and development of such living units requires massive investments which in turn require a higher rental or selling price for each unit so that such units are again out of the financial reach of the low income family.

Other problems are encountered with the presently known modular living units, since most of the units use preformed reinforced concrete walls. For example, the problem of transportation and handling the module because of its weight and the non-flexibility of the concrete is immense, and cracking or other damage often occurs. Concrete walls also tend to absorb water after the building has been completed, resulting in moisture deterioration of the exterior surfaces of the module so that repair and maintenance of the outer surfaces of the modules becomes inevitable.

The housing industry is still attempting to produce low cost housing units which will overcome the structural problems discussed above and which will provide low cost housing within the range of the low income family. The industry is further interested in finding a module which is easily assembled to reduce labor costs and a lightweight and weatherproof module which will reduce the problems relating to transportation and maintenance which have persisted with the presently known modules. The aesthetics of a modular living units is of major importance to the community, as is the requirement for a fire resistant structure. Furthermore, the high cost of labor has raised the need for a modular unit which can be assembled in the factory and moved to a building site for assembly with only a few on-site operations required to erect the finished structure. Furthermore, the modular unit should cut the cost of labor for internal electrical work and plumbing since electrical and plumbing installations generally are two primary factors in raising the cost of housing. The structure must also be long-lasting and of such design that maintenance requirements of the building are nominal, since most low income families are not financially able to maintain structures which deteriorate easily.

SUMMARY OF THE INVENTION

It is, therefore, an object of this invention to provide a method of making a structural module which can be used in the formation of exterior walls of building enclosures.

Another object of this invention is to provide a building module which is strong, durable, easy to handle, and inexpensive, the module being formed from a fiber reinforced plastic shell or form which is filled with a lightweight foamed concrete filler material. Reinforcing members to give longitudinal and vertical strenth to the wall are embedded in the concrete material to permit the module to be handled more easily and to insure that the module will meet the requirements of the most stringent building costs.

Still another object of the invention is to provide a structural module in which various designs and colors may be provided on the outside surface of the module.

Still another object of this invention is to provide a module having window and doorway openings preformed therein so that after the module has been erected standard windows and doors may be positioned and hung within the openings with a minimum amount of labor, time and parts.

Still another object of this invention is to provide a building module which is fireproof, waterproof and moisture resistant.

Still another object of this invention is to provide a module which will eliminate the usual code requirement for a headplate on the upper surface of the walls upon which wooden roof trusses rest by providing a fiber reinforced layer along the upper edge of the present module which is formed integrally with the module itself.

Still another object of this invention is to provide joint connections by which adjacent modules are connected to each other to form exterior walls of the building enclosure, and by which the walls so formed may be fastened to the foundation and the roof.

Still another object of this invention is to provide a module which eliminates the additional requirement of a bell course along the upper edge of a wall, as is now required by building codes in areas where hurricanes are prevalent. This is accomplished by forming integrally with the module a bell course portion along the upper edge of the module as it is manufactured.

Still another object of this invention is to provide a prefabricated housing structure and system for low cost housing.

Still another object of this invention is to provide a building module structure which may be used in assembling the exterior walls of a complete prefabricated house and which will provide an interior wall structure having increased flexibility in the manner in which the interior may be decorated, being capable of receiving wallpaper, plaster, paint, paneling, etc.

Still another object of this invention is to provide a prefabricated housing structure in which the electrical wiring conduits and plumbing are preinstalled in various interior and exterior walls prior to the erection of the walls.

Still another object of this invention is to provide a prefabricated housing structure in which prebuilt kitchen cabinets and bathroom facilities may be easily installed in predetermined locations within the structure.

Still another object of this invention is to provide a prebuilt utility wall in which the plumbing for the bathroom and the kitchen is preinstalled, thereby permitting the wall to be installed over existing supply and sewage disposal pipe lines.

Still another object of this invention is to provide a low cost housing unit having its major components, such as exterior walls, roof trusses, cabinets, etc., manufactured in a factory away from the building site and then transported to the site where these components may be readily assembled into a finished product within a very short time.

These and other objects are accomplished by the present invention through the use of a building module having a fiber reinforced plastic shell with a rectangular center portion and upturned edges forming a recess which is filled with a lightweight cellular concrete filler material. The module further includes reinforcing members supported within the recess and spaced from the inner surface of the shell so that they are embedded in the concrete material. The reinforcing members in the module are arranged so that the module and the completed building will meet the most stringent building code specifications; the reinforcement further provides vertical and lateral strength to the module to prevent cracking while the module is being handled and transported.

The module further includes window and doorway openings and frames which are formed as an integral part of the module as it is being manufactured, the frame being made by molding the sills and jambs in the plastic shell prior to filling the shell with the lightweight cellular concrete filler material. The plastic shell has a pattern molded in the outer surface with a design which may give the appearance of brickwork, plank siding showing the wood grain, or any other selected design. Electrical conduits and outlets are embedded within the concrete filler material at preselected locations, and receive electrical wiring after the module is erected as the walls of the building structure.

The module is primarily used in a prefabricated building system having a rectangular foundation upon which the preformed structural modules may be secured, with a plurality of modules forming the exterior walls of the building enclosure. Supply and discharge piping are disposed within the foundation at predetermined locations. The enclosure has a plurality of spaced parallel roof trusses which are carried on and secured directly to the upper edges of the modules forming parallel sides of the enclosure wall. A weatherproof roofing material is secured to the outside of the trusses while interior ceiling panels are secured to the inside surface of the trusses. A floor slab of the same cellular concrete material that is used for the modules is poured over a compacted fill within the building enclosure, and this slab covers and reinforces the lower joint connections between adjacent exterior modules and between the modules and the foundation.

The prefabricated house further includes interior walls which are used to divide the building structure into units and rooms. The interior walls are formed by a pair of spaced parallel panel members having a honeycombed filler insert sandwiched between the panel members. A prefabricated utility wall containing the internal plumbing required for each housing unit is positioned between the bathroom and kitchen so that the facilities and appliances in these two rooms as well as the prepositioned supply and disposal piping may easily connected directly to the utility wall. Other internal furnishings, such as kitchen cabinets, are prebuilt at the factory and are transported to the site where they are installed within the structure at predetermined locations.

BRIEF DESCRIPTION OF THE DRAWINGS

The foregoing and additional objects, features and advantages of the invention will be apparent to those skilled in the art from the following detailed description of a preferred embodiment, taken with the accompanying drawings, in which:

FIG. 1 is a front elevation view of a low cost duplex housing unit utilizing a plurality of the building modules of the present invention to form the exterior walls of the enclosure;

FIG. 2 is a floor plan of the low cost duplex housing unit having the roof removed in order to show the arrangement of the two complete living units in accordance with the present invention;

FIG. 3 is a pictorial representation of the method of making the building module, showing the steps required to form the complete module according to the subject invention;

FIG. 4 is a perspective of a typical mold required in making a plastic shell for the building module according to the present invention;

FIG. 4A is a cross-section as taken on line 4a—4a of FIG. 4;

FIG. 5 is an elevation view of a complete building module prior to erection of the building foundation, showing the outside pattern design and window and doorway openings according to the present invention;

FIG. 6 is an elevation view of the building module prior to erection which shows the interior side of the module and the location of the reinforcing members and electrical conduits according to the present invention;

FIG. 7 is a cross-sectional view of the building module according to the present invention, taken on line 7—7 of FIG. 6;

FIG. 8 is a detailed view of a portion of the cross-sectional view of FIG. 7 showing supports for the reinforcing members and an aggregate which is used to increase bonding between the plastic shell and a lightweight filler material;

FIG. 9 is a partial cross-sectional view of a housing unit as taken on line 9—9 of FIG. 1, showing the front exterior wall, foundation, and floor slab and means for securing the exterior wall to the slab and foundation in accordance with the present invention;

FIG. 10 is a cross-sectional view taken on line 10—10 of FIG. 9;

FIG. 11 is a detail of a portion of the roof of the housing unit according to the present invention showing the outrigger trusses along the side exterior walls of the housing unit;

FIG. 12 is a detailed view of a typical corner securing connection on the top surface of the exterior module according to the subject invention;

FIG. 13 is a detailed view of a typical lower corner connection between exterior wall modules according to the subject invention;

FIG. 14 is a detailed view of an upper connection between adjacent exterior wall modules in a single plane which shows the connection between the modules and the center roof truss according to the subject invention;

FIG. 15 is a detailed view of a lower connection between adjacent modules in a common plane according to the present invention;

FIG. 16 is a cross-sectional view of an integrally formed doorway opening, as taken on line 16—16 of FIG. 1;

FIG. 17 is a cross-sectional view as taken on line 17—17 of FIG. 1;

FIG. 18 is a cross-sectional view of an integrally-formed window opening as taken on line 18—18 of FIG. 1;

FIG. 19 is a cross-sectional view as taken on line 19—19 of FIG. 1;

FIG. 22 is a detailed view of the construction of an interior wall panel according to the subject invention;

FIG. 23 is a detailed view of a typical interior wall panel floor connection according to the subject invention;

FIG. 24 is a detailed view of a typical roof connection between an interior wall panel and the ceiling panel structure of the duplex according to the subject invention;

FIG. 25 is a cross-sectional view showing the connection between the party wall and the ceiling structure of the duplex, as taken on line 25—25 of FIG. 2; and FIG. 26 is a cross-sectional view of the connection between the party wall and the ceiling structure of the duplex, as taken on line 26—26 of FIG. 2.

DESCRIPTION OF THE PREFERRED EMBODIMENT

Housing Unit

Figure 20:
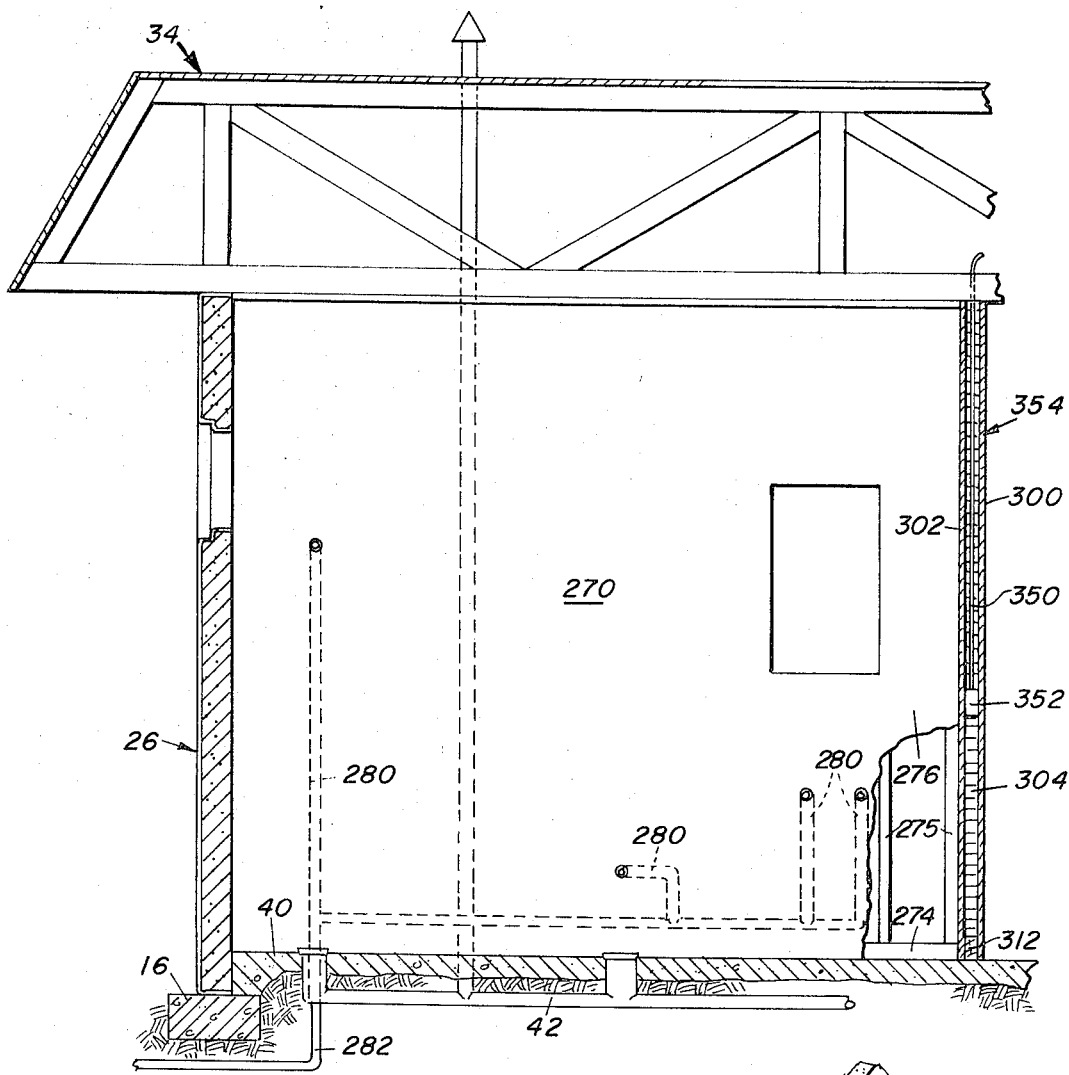
FIG. 20 is a sectional view as taken on line 20—20 of FIG. 2 showing in side elevation the utility wall according to the subject invention.

Referring more particularly to the drawings, in FIG. 1, the numeral 10 indicates a low cost duplex housing structure having two living units 12 and 14. The duplex 10 rests on a foundation 16 (see also FIG. 2) which has a horizontal upper surface that is disposed slightly below grade level. In this preferred embodiment, the foundation or footing 16 is generally rectangular, corresponding to the desired floor plan of the duplex. The footing is approximately 16 inches wide and 10 inches or more deep, as viewed in cross-section, and is formed of any suitable material such as 250 p.s.i. concrete reinforced with two parallel spaced reinforcing rods 17 located at a depth of approximately 5 inches, or the midpoint of the foundation.

As can be seen in FIG. 2, the preferred embodiment of the duplex 10 is a rectangular enclosure having front exterior wall modules 18 and 20, a pair of side exterior wall modules 22 and 24 and rear exterior wall modules 26 and 28. A party wall 30 divides the duplex into the two living units 12 and 14. Each living unit generally includes a living room-dining room area, two bedrooms, a bathroom, and a kitchen. However, many variations in the floor plan can be made and such variations will be apparent to those skilled in the art. For the purpose of explaining the building system, only the preferred embodiment of the housing duplex shown in FIGS. 1 and 2 will be discussed. It will be apparent, however, that the exterior wall module can be used to form houses having other floor plans and different exterior appearance, and to form other building structures such as offices, warehouses, and the like.

The duplex 10 has a roof structure 34 (see FIG. 1) consisting of a plurality of parallel, spaced roof trusses 36 resting directly on the upper edge of the exterior wall modules. The trusses extend from the front modules 20 and 18 to the rear modules 26 and 28. The configuration and the structural material of the roof structure 34 will be discussed hereinafter. The duplex also has a floor slab 40 which will be described later. Sewage discharge line 42 (see FIGS. 1 and 2) and appropriate water supply lines (not shown) running from supply lines or sewage systems located outside the duplex are embedded in a compacted fill directly below the floor slab 40. The piping for the sewage disposal and water supply runs to predetermined locations in each of the units 12 and 14 and turns upwardly and terminates in outlets which are connected to interior wall piping connections as will be explained hereinafter. The basic unit for building the duplex house is the exterior wall module which will now be described.

Exterior Wall Module

As can be seen in FIG. 2, the side modules 22 and 24 are similar in shape, size and configuration; however, front modules 18 and 20 and rear modules 26 and 28 are shown as having their door and window openings disposed at different positions, with the front doors in each of the front modules 18 and 20 located near the center of the duplex and the back doors in modules 26 and 28 similarly located. Therefore, there are five module configurations which must be formed (i.e., 18, 20, 26, 28, and 22) in order to make the duplex house illustrated. Other module designs may be used, and if desired the duplex can be made from only three different module configurations by using two front modules 18, two side modules 22 and two rear modules 26. If the three-module configuration is used, one of the living units 12 or 14 will require rearrangement and relocation of the sewage disposal and water supply piping outlet locations. Such an arrangement eliminates one window from the bedrooms of one unit, and places these bedrooms next to the living room and kitchen of the other unit. Such an arrangement would be undesirable from the point of view of comfort and privacy, and thus the preferred embodiment of the duplex would be the embodiment where five module configurations are used rather than a minimum of three. Since all of the modules are made in a similar manner, the method of making one of the front modules 18 will be discussed; however, it should be understood that the other exterior wall modules can be made similarly.

Mold

FIG. 3 illustrates one step by step process which can be used to manufacture the exterior wall building modules; however, prior to discussion of the method shown in FIG. 3, the mold or forming surface 44 (see FIG. 4) which is used in the process of FIG. 3 will be described. Mold 44 is generally rectangular in shape and in a preferred embodiment is approximately 35 feet in length by 9 feet in height by 5 inches in depth. The rectangular center portion 46 has a pattern formed thereon which can be of any selected design; a preferred embodiment of this design may take the form of a brickwork pattern formed along the sides of the mold at 48, 48', as can be seen in FIG. 4. Between the side brickwork patterns, a vertical plank or board pattern 50 is preferred. The plank pattern is formed by producing an impression of various wood grain arrangements in each of a plurality of adjacent planks. Generally, it is preferable to have the patterns raised, or embossed, on the surface of the mold because it is easier to apply a coating to the raised surface Nevertheless, any conventional method may be used to form the patterns in the mold.

A pair of window opening mold projections 52 and 54 and a door opening mold projection 56 are formed on the rectangular center portion 46 of the mold 44 in desired locations as can be seen in FIGS. 4 and 4A, these upstanding projections forming "land" areas which will provide shaped openings in the module. The window and door opening projections 52, 54 and 56 are formed to provide sill lips 58 at the bottom of the openings and jamb lips 59 at the sides of the openings, the lips being shaped to correspond to conventional wooden framing so that the completed exterior wall module will have preformed window and doorway openings including sills and jambs. Normally, the window mold projections 52 and 54 have larger lips than the door projection 56. The door projection 56 also is formed with hinge indents 60 and 61 adapted to receive door hinges.

Process for Forming Wall Modules

Turning now to the method of making the module which is illustrated in a step-by-step pictorial representation in FIG. 3, it will be seen that in Step 1 a releasing agent 62 of suitable type is sprayed by an appropriate dispensing means on the surface of mold 44. The releasing agent 62 can be a wax, a polyvinyl acetate, or other suitable film-forming material which may be applied to the surface of the mold in any appropriate manner, as by one or more spray nozzles moving across the mold surface, either manually or automatically. After the thin release coating 62 is applied the mold is covered with a gel coat 66 which will normally be a liquid resin material which, after hardening, forms the exterior surface of the module. The gel coat 66 is sprayed onto the mold 44 by any suitable apparatus 67 to a thickness of approximately one-eigth inch to form a weather impervious, durable, maintenance-free exterior surface for the module. If desired, the resin may be mixed with color pigments so that the gel coat has a desired color to provide an attractive appearance for the module. When the gel coat 66 is applied to the mold, it conforms to the surface of the mold so that the outside surface of the gel coat 66 conforms to the patterns 48 and 50 formed on the rectangular portion 46 of the mold 44 to produce the desired decorative effect.

Prior to the hardening of the gel coat 66, a reinforcing fiber 68 is applied to the inner surface of the gel by a feed means such as the movable hopper 70 shown in Step 3. The reinforcing fiber 68, which may be chopped fiberglass or other suitable material, may be applied to the gel coating by sprinkling, blowing or spraying it, or by spreading a layer of fiber by some other suitable means. After the reinforcing fiber is applied to the gel coat, the air bubbles between the gel coat 66 and the fiberglass 68 are eliminated by a rolling step or operation which is diagrammatically illustrated in Step 4 of FIG. 3. In this preferred method, the rolling step is accomplished by hand, and the tool used is a hard cylindrical roller 72 with a handle 73 similar to a paint roller.

When the bubbles have been eliminated between the gel coat and the fiberglass and prior to hardening of the gel coat, an aggregate 74 (see Step 5) is spread or sprinkled over the gel coat and adheres thereto. The aggregate provides a rough surface for improving the bonding between the inner surface of the shell and the filler material to be added in a later step. Any suitable aggregate may be used, a small granular aggregate such as turkey rock being preferred. After the turkey rock has been applied to the gel coat, the gel coat is allowed to harden, a chemical reaction known as kicking occurring between the resin and the fiberglass to bond the two together whereby a strong, lightweight fiber reinforced plastic shell 76 is formed.

While the fiber reinforced shell or part 76 is still in the mold 44 and before the gel coat hardens, structural reinforcing rod support tripods or chairs 75 are set in at appropriate locations, as will be explained hereinafter. These metal tripods or other suitable means for supporting reinforcing rods 77 are secured to the inside surface of the shell 76. as by strips of fiberglass cloth saturated in resin. Other suitable means for securing the chairs to the shell may be used. After the fiber reinforced plastic shell 76 and the fiber glass securing steips for the support tripods, or chairs, has hardened, reinforcing rods 77 are secured by any suitable means to the tripods so that they are supported within the shell recess.

Upon completion of Step 6, the hardened shell 76 containing the reinforcing rods is removed from the mold 44 and carried to a pouring pad, a smooth, flat slab of concrete which supports the shell during pouring and curing of the concrete filler material. While on the pouring pad and prior to filling the shell recess, bolts, J bolts and other fastener means which are to be used in securing the finished modules to other structures, electrical conduits and outlets, and any other fixtures or articles desired are placed and supported in position within the shell recess at desired locations. Thereafter, the shell 76 is filled with a filler material 78 (see Step 8) such as concrete or the like. The filler material 78 may be poured from a mixer 80 or other suitable means. It has been found that a commercially available lightweight cellular concrete known as Cel-Lite, manufactured by the Cel-Lite Company, 3400 Southwest 15th Avenue, Fort Lauderdale, Florida, is an excellent filler material which has adequate strength while having the additional advantage of being lightweight. This concrete is mixed with a foaming agent which produces tiny gas bubbles in the concrete to displace the heavy material, resulting in a concrete that is substantially reduced in weight, without any appreciable loss in strength. Other concrete mixtures using lightweight aggregates are well known, and may be used herein, but the preferred material is Cel-Lite, which has a density approximately 50 percent of regular concrete.

After pouring the filler into the mold, it is leveled and smoothed by a suitable screed, such as an automatic blade 82, by a hand-operated bar, or by hand troweling so that the filler material 78 forms a smooth horizontal coplanar surface with the upper ends of the outer upturned edges of the reinforced plastic shell 76. Normally, several modules may be stacked on a single pouring pad, each shell being positioned on top of the preceding module after the filler material has started to set. The filler material is allowed to cure for the prescribed time, and then the module 20 can be picked up and stored or transported to the building site for erection. A typical module will be approximately 35 ½ feet long, 9 feet high and 4 ½ inchs thick and will weigh approximately 2,800 pounds upon completion. It should also be understood that although other molding methods can be used to form the plastic shell, for example, vacuum cavity molding, the above-described steps are presently the preferred mode of forming the present building module.

Module

FIGS. 5, 6, 7 and 8 illustrate in greater detail a typical front exterior wall module such as that illustrated at 20 in FIG. 1. As shown, the outer surface of the wall module 20 has brickwork or cement block patterns 84 and 84' on the right and left edges as shown in FIG. 5. Such a pattern has been found helpful in disguising the joints between adjacent panels, and thus is preferred. The center portion of the outside surface of the module 20 is shown as having a board or plank pattern 86 with a distinctive wood grain for each of the boards, but any desired exterior design may be used and will depend in part upon the style of the house to be built, the selected design being built into the forming mold 44 as described above. Module 20 has a doorway opening 88 and two window openings 90 and 92 corresponding to the mold projections 52 and 54 described above. These doorway and window openings will receive standard window frames and doors after the module is erected on site. A strip or portion 93 along the lower edge of the module may be formed without a pattern since the strip is normally below grade level; however, if desired the pattern can extend the entire height of the module.

The reverse side or inside surface of the module 20 is illustrated in FIG. 6 with a part of the module broken away to show the manner in which the reinforcing rods are embedded in the foamed concrete material 78. The reinforcing members, or rods, may be arranged in any desired manner to conform to the specifications of the building code of the area in which the module is to be used so that the resultant building meets the required standards. In this preferred embodiment, No. 4 reinforcing bars or rods 94, illustrated in part by dashed lines in the left-hand side of FIG. 6, are generally placed on 16 inch centers throughout the entire module to provide the basic reinforcement of the module. To provide additional strength for transporting and handling purposes, reinforcing bars 96 and 97 are positioned along the side edges 98 and 99, respectively, of the shell 76 and upper and lower reinforcing bars 100 and 102 are positioned along the upper and lower edges 104 and 106, respectively, of the shell 76. The lower reinforcing bar 102 also provides extra strength which acts as a reinforcing beam along the lower edge of the module, in the area of the module generally indicated at 108, while the upper reinforcing bar 100 provides a bell course portion 110 along the upper edge of the module. Bell courses are usually required in areas where hurricanes are prevelant; the present module incorporates this feature without requiring additional structural work. To provide additional strength to the module around the window and doorway openings, reinforcing bars 112 are vertically positioned within the module, parallel and contiguous to the side edges of each of the window openings 90 and 92 and the door opening 88. A horizontal reinforcing rod 114 extends across the module from left to right as viewed in FIG. 6 and is parallel to the upper edge of the window openings 90 and 92 and doorway opening 88. Other reinforcing rods 116 and 117 are positioned parallel to and below the lower edges of the window openings 90 and 92, respectively, while reinforcing rod 118 is positioned along the lower edge of door opening 88. In this preferred embodiment, the extra reinforcing rods are normally No. 5 rods. Further reinforcing for the corners of the window and doorway openings is provided by reinforced mesh strips 119 positioned diagonally and contiguous to each corner of the window and doorway openings in the manner illustrated for window opening 90.

Normally, after the filler material has been poured and cured as described above, it is necessary to lift the entire module from its pouring pad and move it to a storage area or to transportation facilities. One of the major deterrents to manufacturing concrete preforms, or modules, of this size is the problem of moving and transporting them, for prior preforms have been virtually unusable because of the cracking which occurs during these operations. It has been found, however, that because of the tensile strength imparted by the plastic shell and the reinforcing rods the module described herein may be easily handled, and thus, may be pivoted from a horizontal position to a vertical position merely by attaching belts or other lifting means through the window openings 90 and 92 and doorway opening 88 and simply pivoting the module about the lower edge 106, without cracking the filler material 78. The reinforcing rod and plastic shell prevent the module from cracking as it is being pivoted, whereas a normal concrete slab of similar dimensions would crack severely from its own weight. Further, the extra-heavy reinforcing rods around the window and doorway openings permit the module to be lifted by crane without over-stressing the module.

In FIGS. 7 and 8, numeral 120 indicates a typical tripod chair to which the various reinforcing rods are secured when they are placed in the plastic shell; however, any suitable means for supporting and securing the reinforcing rods can be used. The chairs preferably are secured to the plastic shell 76 by fiberglass strips 121, prior to filling the shell with the foamed concrete 78, as has been explained, although other suitable means may be used to secure the chair supports to the fiberglass shell. As mentioned above, numeral 74 indicates the aggregate such as turkey rock which is used to increase the bonding between the shell 76 and the filler material 78.

Since it is necessary to secure the modules to other structures, suitable securing means such as J bolts are provided, and in this preferred embodiment, the J bolts 122, 126 and bolts 124 (see FIG. 6) are located along the upper and lower edges of the module. The J bolts 122 along the upper edge of the module are normally inserted through spacec holes which are drilled in the upper edge 104 of the plastic shell 76, the curved portion of the bolt extending into the concrete 78 and the threaded portion extending outside the module. These J bolts along the top portion of the module are used to secure adjacent modules together and to secure the roof trusses to the module. In this preferred embodiment, the securing means along the lower edge of the module are spaced fasteners 124 inserted through holes in the rectangular portion of the shell 76. The bolts 124 extend through the filler material 78 and exit through the interior surface 125 of the module. These fasteners, which may be of any desirable type such as one-half inch diameter bolts, are used to secure the module to the foundation. Spaced between the fasteners 124 and along the bottom edge 106 of the module are J bolt fasteners 126 which are embedded in the foamed concrete 78 and which extend perpendicular to the inner surface of the module. These J bolt fasteners 126 are used to secure the module to the floor slab 40. Another fastener 128 (FIG. 6) similar to fastener 124 may be provided at the lower edges of the modules so that adjacent modules can be secured together; however, any other suitable means such as molley anchors and the like may be provided for this purpose. It has been found that the J bolt anchors provide adequate strength and are held firmly in place by the foamed concrete material.

As mentioned in the description of the method of making the module, electrical conduits may be positioned within the shell prior to the pouring of the concrete. FIG. 6 shows a typical electrical conduit 130 extending through the edge 104 of shell 76 and running between the door opening 88 and window opening 92 where it communicates with a switch box 132. A branch of the conduit 130 extends down from the switch box 132 and terminates in a duplex outlet box 134. As can be seen by the above-described embodiment of the module 20, a complete exterior wall module can be preformed at a factory or away from the building site and then transported to the site for erection. The module provides an exterior wall surface which is weather impervious, never needs painting, and can simulate any kind of exterior materials to produce any desired style or appearance. The module is strong enough to permit easy handling and to meet even the most stringent building codes, while being lightweight, relatively inexpensive, and easy to assemble into a complete building structure, as will now be described.

Building System

Turning now to the method of erecting a building structure using the module of the present invention, and specifically the method of constructing the duplex 10 described in FIGS. 1 and 2, it will be understood that the site is first prepared by grading and leveling in the conventional manner. The foundation 16 is then poured, the periphery being generally rectangular in shape and being approximately 70 feet in length and 30 feet in width, so as to receive the modular walls. The foundation is approximately 10 inches deep and 16 inches in width, has conventional reinforcing rods extending therethrough, and is laid so that its upper surface is below grade level. J bolts 140 (see FIG. 9), which are embedded in the foundation when it is poured, are spaced around the periphery of the foundation and extend upwardly through the top surface of the foundation. Water supply (not shown) and discharge lines 42, as seen in FIGS. 1 and 2, are laid in compacted fill 142 within the rectangular foundation.

During, or prior to preparation of the foundation, modules 18, 20, 22, 24, 26 and 28 are prepared in the factory, as described above. The completed modules are transported to the site where they are lifted onto the foundation and fastened together to form the exterior walls of the duplex. It should be noted that the dimensions and weight of the present invention are such that it is desired to ship all the modules for a complete duplex house on a single truck. The walls are secured directly to the foundation, as can be seen in FIG. 9, as by means of a standard angle member, or L-bracket 144 approximately 5 × 3 ½ × ¼ having apertures in each leg and being positioned at the juncture between the module and the foundation so that the ends of bolts 124 and correspondingly located J bolts 140 extend through the holes. Nuts or other securing means are threaded on the ends of the bolt and J bolt to hold the wall in place. The apertures in the L-shaped brackets are preferably slotted holes to allow adjustment of the walls with respect to the footing, thereby permitting plumbing of the walls.

After the modules have been positioned on the foundation, it is necessary to secure adjacent modules together, and FIG. 12 shows a typical corner connection which may be used when adjacent modules are to be connected at right angles to each other, as, for example, at the upper end of modules 20 and 22. L-shaped angle members 148 and 148' having holes in each leg are secured to each of the J bolts 122 which extend through the upper edge 104 of the shell forming each of the modules 20 and 22, respectively. A nut, weld or other suitable fastening means can be used to secure the angles 148 and 148' in place. A bolt or threaded rod 150 extends through the holes in the upstanding legs of the angles 148 and 148' and is appropriately secured by a nut so that the edge of module 22 is held in contact with the inner surface of module 20.

FIG. 13 illustrates a typical preferred lower corner connection between two of the modules. Molley anchores 152 and 152' are embedded in the foamed concrete in the modules, and angle members 154 and 154' are secured to the modules 20 and 22, respectively, by bolts 156 and 156' extending through holes in one leg of the angle and into the corresponding molley anchors. The upstanding legs of the angles 154 and 154' have holes which receive the ends of an L-shaped rod 158 threaded at each end and adapted to receive nuts 160 whereby the L-shaped rod 158 is secured to the angles 154 and 154', and when tightened holds the lower corner in a tight-fitting abutting relationship. If desired, the joint between module panels may be hidden by a fiberglass cover which may be glued to the exterior. The fiberglass cover can have a brick or block design similar to the block pattern formed in the exterior of the plastic shell of the module panel. Also, a resin adhesive can be used to adhesively secure the contacting panels along the connecting joint.

FIGS. 14 and 15 illustrate upper and lower connections, respectively, between two adjacent modules which are to be fastened end-to-end so that they form a single wall in one plane. The lower connection between in-plane adjacent modules is similar to a lower corner connection in that angles 162 and 162' (FIG. 15) are secured to the inner surface of the adjoining modules, for example, modules 18 and 20, respectively, by any suitable means such as molley bolts or J bolts as described above. A straight bolt 164 extends through and between the angles 162 and 162' and is secured in position by a suitable nut 166. The upper connection between in-plane adjacent modules serves not only to hold the adjacent wall structures in edge-abutting relationship, but is also used as a means for securing a roof truss 36 to the upper edge of the exterior wall modules. The J bolts 122 which were prefabricated in modules 18 and 20, for example, extend upwardly through a bracket 170 (see FIG. 14) which is formed by a horizontal bearing plate 172 having apertures therethrough which receive the J bolts 122. Two spaced vertically extending plates 174 and 174' are secured to the upper surface of the bearing plate 172 by any suitable means and receive the center truss member 36. The vertical plates 174 and 174' have aligned apertures which receive a bolt 176 that extends through truss 36. In the particular structure shown herein, truss 36 is the center truss in the building and, together with the juncture between adjacent panels, defines the dividing line between parts of the duplex. The connector devices illustrated in FIGS. 9 and 12–15 may thus be used in various combinations to fasten the wall modules together and to the foundation after they have been positioned on a properly-prepared foundation. It will be noted that the center truss 36 is sheathed on one side by a sheet of gypsum board, plywood or the like 179 to form a divider between the two units of the duplex.

Roof

The subject wall modules, being of a cellular concrete structure, have sufficient strength in compression to support the roof structure of the building. Thus, a plurality of trusses are secured, as by corresponding brackets 170 arranged along the upper edges of the exterior wall modules, in a parallel spaced relationship and extend between front modules 18 and 20 and rear modules 26 and 28. An edge truss 180, as seen in FIG. 11, is secured along and is parallel to the upper edge of the side wall module 22, as by an angle bracket 182 secured to the upper edge of module 22 by J bolts 122. As has been explained, J bolts 122 extend through the upper edge of the module and are threaded so that the bracket may be secured by a nut. Any suitable fastening means 184 such as a nut and bolt, screw, or the like can be used to secure the end truss 180 to the angle 182. To accommodate the particular style of roof treatment illustrated in FIG. 1, a plurality of outrigger trusses 186 are suitably secured to the end truss 180 and extend perpendicular to this truss to provide the side eaves for the roof structure 34. It will be apparent that a similar arrangement of end and out-rigger trusses will be provided for the opposite side wall of the building, and thus would be supported on end wall module 24.

A plurality of intermediate roof trusses 190 are spaced between the end truss 180 and its counterpart on module wall 24, a typical such intermediate truss being illustrated in FIG. 9. These trusses and center truss 36 are secured directly to the top of and extend between the front and rear modules 18, 20, and 26, 28, respectively. The upper edge 104 of each module eliminates the requirement for a head plate between the wooden trusses and the concrete structure, since the plastic shell acts as a moisture barrier between the concrete and the wood. The J bolts which extend through the upper edge 104 secure angle brackets 192 to the module, with the intermediate trusses 190 secured by suitable means to the upstanding leg of the angle bracket to hold the trusses in place. If desired, the trusses may be secured by means of bearing plate brackets 170 (FIG. 14), but where such brackets are used it is generally necessary to notch the lower edge of the beam which rests on the bracket so that the lower surface of the truss will be in the same plane as the upper surface 104 of the module. It will be noted in FIG. 9 that the trusses are designed to extend beyond the plane of the wall module in order to form the eave structure along the front and back of the building which is dictated by the particular roof style illustrated.

After the trusses have been secured to the exterior wall modules, they are braced for rigidity and suitable roofing and ceiling materials are applied to the exterior and interior of the trusses, respectively. In this preferred embodiment, a galvanized corrugated sheet 194 is secured to the upper surfaces of the trusses, as seen in FIG. 9. Sheet 194 carries a layer 196 approximately one-half inch thick of a suitable filler material such as the Cel-Lite foamed cellular concrete used to fill the exterior module wall shells. An asphalt layer 198 is then applied directly to the concrete layer. This arrangement of the layers of roof covering eliminates the necessity of roofing felt. Around the peripheral edges of the concrete layer 196, an aluminum strip 200 is provided to contain the asphalt and to overhang roof siding boards, or fascia, such as that indicated at 202, these siding boards being secured to the ends of the trusses along the front and back, and to the ends of the outrigger trusses on the sides of the building.

A typical connection between adjacent siding boards 202 is illustrated in FIG. 10, where adjacent boards 204 and 206 are shown as being secured to the end of truss 190 by suitable fastening means such as aluminum nails, and a vertical batten 208 is secured over the connection between the boards. The batten can be nailed and epoxy glued to the outside surface of the boards or secured by other suitable means. Alternatively, the exterior surface of the siding boards may be shingled or otherwise covered depending upon the appearance desired. The under surface of the eaves, or roof overhang, is covered by a soffit 210 approximately three-fourths inch in thickness which is suitably secured to the lower edges of the trusses. Any suitable material may be used for this purpose. Soffit vents 212 are provided at appropriate locations around the eaves of the roof to provide the required ventilation.

After the roof trusses and exterior roofing have been installed, various utility cables may be installed within the roof structure. Electric wiring, telephone cables, air conditioning and heating ducts, and water pipes if necessary, may be positioned at predetermined locations to cooperate with the corresponding ducts and conduits in the exterior and interior walls. Thereafter a suitable ceiling material 214, such as 1 ½ inch thick gypsum board, acoustic tiles, or the like, may be secured to the lower surfaces of the roof trusses 180, 190. Any desired variation in the configuration of the roof structure can be made, for example, the overhang of the trusses may be increased on the side or back to provide a roof over entryways and sidewalk.

Floor

In the disclosed embodiment, the floor surface of the building is a concrete slab 40 which is poured onto a compacted fill material 142 to a thickness of approximately 4 inches, in known manner. Although the floor slab may be a conventional concrete mixture, it is preferred to use a cellular, lightweight concrete such as the Cel-Lite material used in the exterior wall modules. The slab is of increased thickness along its edges so that the connections between the wall modules and the foundation 16 are covered (see FIG. 9). In this manner, the J bolts 126, which are secured in the wall modules when they are formed, are embedded in the slab to increase the strength of the connection between the modules and the floor slab 40 and thus to hold the walls firmly in place. In addition, the floor slab covers the angle brackets 144, and prevents them from working loose, thus increasing the structural integrity of the building. It will be understood that conventional reinforcing materials 218 such as wire grid or the like is provided to strengthen the floor slab. As illustrated, the upper surface 220 of the floor slab is approximately level with the lower sill 222 of the doorway opening.

Window and Door Installation

The window frames and doors which are installed in the window and doorway openings molded into the exterior wall modules preferably are commercially available preassembled units. As can be seen in FIG. 16, the door opening 88 (FIG. 5) in module 20, which was formed by the projection 56 on the mold 44, has a straight upper edge, or head jamb, 230, while the side jambs 232 and 234 (see FIG. 17) and threshold 236 which define the remainder of the opening have a step or shoulder 238 which is formed by the lips on the projection 56 in mold 44, as described with respect to FIG. 4A. A door 240 is hung in doorway opening 88 by means of a pair of hinges 242 and 242' which are secured to the door and to the module. One leaf of each hinge fits into a corresponding hinge notch formed in the side jamb 232 of the door opening, the notches being formed by the hinge cutouts 60 and 61 on the projection 56 of mold 44 as the module is manufactured. A door stop molding 248 is secured by appropriate fastening means 250 along the upper and side edges of the doorway opening 88, and an extruded aluminum plate 252 carrying a rubber or vinyl weatherproofing strip is seucred to the threshold of the doorway opening, as seen in FIG. 16. In order to insure that the doorway will be sealed when the door is closed, a felt or other suitable strip 251 is secured to the door stop molding 248. If desired, an extruded cap 254 may be provided along the upper edge of the door 240 to provide weather protection for the door material.

A typical window installation is illustrated in FIGS. 18 and 19, wherein commercially available window frames 256, such as the Tucker Series 600 awnings or Series 950 single hung windows are inserted into the module window openings. The window openings are formed of appropriate size and shape so that when the window unit is installed it engages the lower sill 258, the head 260 and the side edges 262 and 264 of the window opening. As was the case with the door opening, each window opening is formed with suitable shoulders against which the window frame abuts when it is in place. A suitable sealing material 265 is applied around the outer edge of the window frame between the frame and the shoulder portion of the opening in order to weatherproof the installation. The window frames are held in place by means of screws 266 extending through the window frame, through the plastic module shell and into the concrete filler material. The screws are gripped tightly by the concrete, since the plastic shell prevents the concrete from cracking and breaking away from the screw at its entry point. Since the size of the window openings cannot be changed after the module is completed, the window frames are normally slightly smaller than the window openings so that they can be easily installed; therefore, space between the edge of the window opening and the window frame will normally exist. This space can be filled with plaster 267 or other suitable filler material, the material being carried forward to the inner wall surface and smoothed out to define a rectangular window opening. A galvanized corner bead 268 is embedded in the plaster around the inside corner of the window opening, in conventional manner.

Utility Wall

Figure 21:
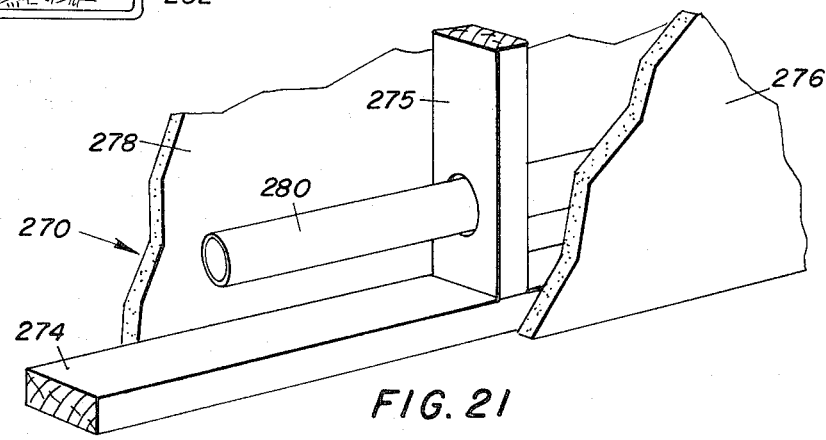
FIG. 21 is a detailed view of the utility wall with the side panels broken away to show the internal pipes as contemplated by the present invention.

As mentioned above, two of the best ways to reduce the cost of housing and therefore, to reduce the selling price of the unit, are to preform all possible components in a factory so that they may be mass produced, and to reduce the labor time required to install internal plumbing and electrical wiring in the house. In order to take advantage of these cost-reducing factors, a utility wall 270 (see FIGS. 2 and 20) carrying all of the required internal piping for one living unit is prebuilt in a factory. If desired, electrical conduits and outlets may also be provided in the utility wall. Utility wall 270, disposed between the kitchen and bathroom of living unit 12 (see FIG. 2) and a corresponding wall 270' (not shown) will be similarly placed in living unit 14. As illustrated in FIGS. 20 and 21, the utility wall 270 is normally a stud wall having upper and lower horizontal members 272 (not shown) and 274, with a plurality of spaced, parallel vertical studs 275 disposed between the upper and lower horizontal members. Preferably 2 × 4 lumber is used for the horizontal and vertical stud members, but other suitable sizes can be used. Interior supply and discharge piping 280 is installed in the utility wall, the arrangement and location of the internal piping being determined by the planned location of the bathroom and kitchen fixtures and the exterior supply and discharge piping. After installation of the plumbing and any electrical conduits or cables that may be required, the stud wall 270 is covered by gypsum board or other suitable wall panels 276 and 278. The completed utility walls 270 and 270' are then ready to be secured between the floor slab 40 and the ceiling of the living units by any appropriate method. When installed, the utility wall is located over the inlet water supply piping 282 and the discharge sewer connection piping 42 which extends through the floor slab 40. The utility wall contains all of the indoor plumbing which is required for such living units.

Interior Wall Panels and Party Wall

As previously mentioned, the living units 12 and 14 of the illustrated duplex building are separated by a common, or party wall 30 (see FIG. 2), and each unit is divided into various rooms by a plurality of interior wall panels 31. The interior walls can be any commercially available panel; however, it has been found that a commercially available "sandwich" type of panel known as Kor-Hof meets the requirements of the present invention and thus is used in this preferred embodiment. The Kor-Hof panel comprises a pair of rectangular sheets 300 and 302 of gypsum board secured to opposite sides of a honeycombed insert 304 (see FIGS. 22 and 23). The insert 304 is a heavy Kraft paper which is treated for fire resistance. The method of securing the interior wall panels between the roof and the floor of the duplex is illustrated in FIGS. 23–26; preferably these walls are installed after the ceiling boards 214 are secured to the bottom of the roof trusses.

FIG. 23 illustrates a typical floor connection between an interior wall panel 31 or one panel of the party wall 30 and the floor slab 40. Portions of the honeycombed insert 304 along the upper and lower edges of the interior wall panel are removed to form upper and lower troughs 308 (FIG. 24) and 310 (FIG. 23). A rectangular base member, or floor runner, 312 is secured to floor 40, as by a thin strap 314 having suitable fastening means, or by driving a case hardened nail through the base member 312 into the floor. The base members are secured to the floor in a desired outline which conforms to the configuration of the rooms within the living unit. The base members 312 are made of 2 inch × 2 inch lumber in this preferred embodiment since the troughs formed in the Kor-Hof panels are approximately 2 inch in width. Preferably, the joints between adjacent base members 312 do not coincide with the joints between adjacent interior wall panels in order to give a more stable joint.

The installation of the interior wall 31 to the ceiling is accomplished in this preferred embodiment by first securing suitable spacers 316 and braces 318 to the roof trusses at appropriate positions prior to the installation of the ceiling members 214, as can be seen in FIG. 24. An elongated rectangular ceiling member, or runner, 320, which is normally of smaller size than the base member 312, for example, 1 ⅜ inch × 2 inch lumber, is secured to the ceiling panel 214, ceiling spacer 316 and brace 318 by nails or other suitable fastener means. Such braces and spacers are used where the location of the wall does not coincide with a truss; where there is such coincidence of course, the member 320 may be nailed to the truss through ceiling panel 214. Since the ceiling member 320 is normally smaller in width than the base member, only one of its side surfaces is vertically aligned with a corresponding side surface of a base member 312. In order to insure easy installation and positioning of the interior wall panels, several techniques can be used. For example, the ceiling member 320 can be smaller than the base member 312 as mentioned above, the upper trough 308 can be deeper than the lower trough 310 or the height of the panel 31 can be slightly less than the distance between the ceiling and the floor. Thus, the panel 31 can be installed by inserting upper block 320 into the upper trough 308, raising the panel 31 until it clears the base member 312 moving the panel to a vertical position and then lowering the panel to insert base member 312 in lower trough 310. After the panels are positioned on the base and ceiling members, they are secured thereto by appropraite means such as nails, screws or the like. A suitable metal strip 321 or tape may be used to cover the space between the upper edge of the panel and the ceiling board 214. Openings or doorway passages between rooms are provided in the interior wall panels at desirable locations, and suitable doors are hung therein.

Turning now to the installation of the party walls, it will be seen in FIGS. 25 and 26 that the common wall between living units is normally made of a pair of parallel spaced interior wall panels which are secured to the floor by nailing them to opposite sides of a floor runner, or by separately securing the two panels in the manner described above for single interior wall panels. However, installation of the party wall to the ceiling varies slightly at different locations, and FIGS. 25 and 26 illustrate the method of connecting the party wall to the ceiling at two separate locations. The connection illustrated in FIG. 25 is typically used between the living rooms of the living units 12 and 14, while the ceiling connection illustrated in FIG. 26 is typical of the party wall between the kitchens of the living units. As can be seen in these figures, the space between the interior walls is greater between the kitchens than at the living rooms, the purpose of this increased space being to provide room for electrical wiring, vent pipes, and the like, which are required for the washing machines, clothes dryers, water heaters and other appliances that are positioned against this wall in this particular embodiment. The party wall connection illustrated in FIG. 25 includes an elongated rectangular nailer block 330 which is secured to the side of center truss 36 and to which the ceiling runner 331 can be attached. The left interior wall panel 332, as seen in FIG. 25, is secured to runner 331 in the same manner as described above with the typical connection between a single interior wall and the ceiling. A spacer 334 is then nailed to the left party wall member 332 and the right party wall member 336, having an elongated rectangular insert 338 completely filling the upper trough 308, is secured to the spacer 334. The space between the upper edge of the party wall members 332 and 336 and he ceiling is covered by suitable metal corner strips or tape.

The party wall and ceiling connection illustrated in FIG. 26 utilizes an oversized runner block 340 which is secured directly to the center truss 36 through the ceiling panel 214 by nails, screws or the like. The party wall members 332 and 336, each having an elongated insert 338 filling its entire upper trough 308, are secured to opposite sides of the oversized block 340. During the installation of the interior walls and the party walls, electrical conduits 350 and outlets 352 can be positioned within the interior walls at desired locations by removing portions of the honeycomb insert 304. A portion of such a wall is illustrated at 354 in FIG. 20.

Upon completion of the installation of the party walls, interior wall panels, window frames and doors, the surfaces of all of the interior wall panels 31, the party wall 30 and the interior surfaces of the exterior wall modules are covered with a thin plaster layer or hard coat 375. The plaster provides a smooth interior surface which can be decorated in any suitable manner, such as by painting, wallpapering, and the like. After the interior walls have been plastered, the bathroom and kitchen plumbing fixtures, kitchen appliances, including stove, sink, washer and dryers, cabinets and counters are installed at predetermined locations. These fixtures and appliances are commercially available items; however, the kitchen counters and cabinets are prebuilt to desired specifications so that they may be easily installed by simply securing them to the walls by brackets or other suitable means. After installation of heating and air conditioning units, hot water heaters and the like, and the hanging of interior doors, the building is complete.

It can be seen from the above-description and drawings that this improved low-cost duplex provides a prefabricated components for almost a complete housing structure and a construction system for using the prefabricated components to make the duplex easy to assemble. The exterior wall module provides a flexible wall panel which overcomes many of the problems of the prior art such as the transportation and moisture problems, reduction of on-site labor cost. etc. The plastic shell of the module covers all exposed surfaces by extending over the edges and into the door and window openings, but the interior surfaces of the module have no plastic coating, thus reducing the complexity and expense of making the module, while permitting maximum flexibility in treating or covering the interior surfaces. The upper edge of the plastic shell eliminates the need for specially treated wood header or metal header simplifying construction. The plastic shell prevents the interior of the module from sweating and also acts as a sound deadener. The module can be transported vertically, rather than horizontally, as is normally required in most concrete modules, thus making handling and shipping easier.

The embodiment described above can also be modified in numerous ways as will be apparent to those skilled in the building art. Such modifications include changing the design of the pattern on the exterior module, changing the floor plan within the living units, changing certain materials, increasing or decreasing the number of reinforcing members within the module, using exterior modules to form the interior walls, etc.; however, this type of variation and change can be made in the subject invention without departing from the true spirit of the invention as defined in the following claims.

What is claimed is:

1. A structural building module comprising:
   a. a glass fiber reinforced resin shell shaped to form in a single piece an entire wall of a building enclosure, said shell having a first substantially planar surface portion and upturned peripheral edge portions defining a recess having a depth which, when added to the thickness of said shell, is equal to the desired thickness of said wall;
   b. aggregate means secured to the interior of said shell to provide a rough interior surface;
   c. means on the exterior surface of said shell forming a pattern to simulate a selected building material;
   d. reinforcing members secured to the interior surface of said shell; and
   e. a foamed cellular concrete material having a density substantially less than that of ordinary concrete filling said recess and surrounding said aggregate means so as to be bonded to said shell, said cellular concrete material and said shell forming an enclosure wall of the desired thickness to provide a structural wall module having improved strength and reduced weight, said shell forming a weather-resistant exterior surface, the upturned peripheral edges of said shell providing the ends, top and bottom edges and the surface of said concrete material forming the interior surface of the modular wall structure.

2. The building module of claim 1, wherein said foamed cellular concrete material has a density of approximately 50 percent that of ordinary concrete.

3. The building module of claim 1, wherein said reinforcing members secured to the interior surface of said shell are embedded in said concrete material.

4. The building module of claim 1, further including at least one opening formed in said shell and extending through said concrete material.

5. The building module of claim 4, wherein said shell further includes second upturned edge portions around the periphery of said opening and extending inwardly from said first planar surface portion to cooperate with said first-named peripheral edge portion and said first planar surface portion to define said recess, and wherein said edge portions terminate in a common plane substantially parallel to said first planar surface, said cellular concrete material filling said recess whereby the exposed surface of said concrete material is substantially coplanar with said common plane.

6. The building module of claim 5, wherein said reinforcing members substantially surround said opening and are embedded in said concrete material.

* * * * *